US011485179B2

(12) United States Patent
Agarwal et al.

(10) Patent No.: US 11,485,179 B2
(45) Date of Patent: Nov. 1, 2022

(54) ELECTRICALLY CONDUCTIVE TIRE SEALANT FOR PUNCTURE DETECTION

(71) Applicant: Bridgestone Americas Tire Operations, LLC, Nashville, TN (US)

(72) Inventors: Sheel P. Agarwal, Solon, OH (US); Terence E. Wei, Copley, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 658 days.

(21) Appl. No.: 15/780,701

(22) PCT Filed: Dec. 1, 2016

(86) PCT No.: PCT/US2016/064428
§ 371 (c)(1),
(2) Date: Jun. 1, 2018

(87) PCT Pub. No.: WO2017/105860
PCT Pub. Date: Jun. 22, 2017

(65) Prior Publication Data
US 2019/0001761 A1  Jan. 3, 2019

Related U.S. Application Data

(60) Provisional application No. 62/267,958, filed on Dec. 16, 2015.

(51) Int. Cl.
| | | |
|---|---|---|
| B60C 1/00 | (2006.01) | |
| B60C 19/12 | (2006.01) | |
| B29D 30/06 | (2006.01) | |
| B60C 19/08 | (2006.01) | |
| B29C 73/16 | (2006.01) | |

(52) U.S. Cl.
CPC ............ B60C 19/08 (2013.01); B60C 19/122 (2013.01); *B29C 73/163* (2013.01); *B29D 30/0685* (2013.01); *B60C 1/00* (2013.01)

(58) Field of Classification Search
CPC ......... B60C 1/00; B60C 19/12; B60C 19/122; B60C 19/125; B60C 19/127; B29D 30/0685
See application file for complete search history.

(56) References Cited

U.S. PATENT DOCUMENTS

| | | | |
|---|---|---|---|
| 2,756,801 A | 7/1956 | Iknayan et al. | |
| 2,782,829 A | 2/1957 | Peterson et al. | |
| 4,067,288 A | 1/1978 | Saito et al. | |
| 4,113,799 A * | 9/1978 | Van Ornum | B29C 73/163 525/99 |
| 4,545,927 A * | 10/1985 | Railsback | C08K 3/04 252/502 |
| 8,293,049 B2 | 10/2012 | Incavo | |
| 8,387,672 B2 | 3/2013 | Majumdar | |
| 8,617,333 B2 | 12/2013 | Majumdar et al. | |
| 8,959,990 B2 | 2/2015 | Harlann et al. | |
| 8,996,239 B2 | 3/2015 | Orlewski | |
| 9,073,392 B2 | 7/2015 | Orlewski | |
| 2004/0238090 A1 | 12/2004 | Ueda et al. | |
| 2008/0078489 A1 | 4/2008 | Fukutomi et al. | |
| 2015/0056391 A1 | 2/2015 | Dry | |

FOREIGN PATENT DOCUMENTS

| | | |
|---|---|---|
| DE | 468420 C | 11/1928 |
| DE | 102005031267 A1 | 1/2007 |
| DE | 102008053506 A1 | 4/2010 |
| DE | 102009049262 A1 | 4/2010 |
| DE | 102011003707 A1 | 8/2012 |
| DE | 102012216576 A1 | 5/2014 |
| EP | 0007982 A1 | 2/1980 |
| EP | 1580232 * | 9/2005 |
| EP | 2848434 A1 | 3/2015 |
| GB | 2088607 * | 6/1982 |
| KR | 101526138 B1 | 6/2015 |
| WO | WO 2014/124349 * | 8/2014 |

OTHER PUBLICATIONS

Newell, et.al., Integrity sensing with smart polymers and rubber components on vehicles (i.e. tires, hoses, seals); SAE 2013 World Congress and Exhibition, Technical Papers, 2013, vol. 2.

* cited by examiner

*Primary Examiner* — Justin R Fischer
(74) *Attorney, Agent, or Firm* — Shaun J. Fox; J. Gregory Chrisman

(57) ABSTRACT

Tires having an electrically conductive tire sealing material containing metallic electrically conductive particles are described for detecting the presence of one or more sealed puncture areas in the tire. The tires can have a sealed tire portion that is formed by the electrically conductive tire sealing material flowing into and filling a puncture in the tire. The sealed tire portion includes a portion having electrically conductive particles and the portion being at the outer surface of the tire such as in the tread area. The tire can be positioned to be in contact with a conductive section of an apparatus capable of measuring electrical conductivity.

17 Claims, No Drawings

ELECTRICALLY CONDUCTIVE TIRE SEALANT FOR PUNCTURE DETECTION

TECHNICAL FIELD

The present disclosure relates to pneumatic tires having an electrically conductive tire sealant material for sealing a puncture, and more particularly, pneumatic tires having a detectable sealed tire area formed from the electrically conductive tire sealant material for identifying a punctured tire.

BACKGROUND

Tires are generally still operable after a puncture because an object that passes through a tire often does not easily come out and air does not leak rapidly from the tire. However, over a long period of run time, the object is exposed to centrifugal forces caused by the rotation of the tire that can dislodge the object. When the object comes out, air quickly leaks from the tire and operation of a vehicle can become dangerous. To combat punctures, modern puncture-sealing pneumatic tires provide a sealant material that prevents the leakage of air when a foreign object, for example, a nail on a roadway surface, penetrates through the tire during operation.

The sealant layer is often formed of a thin viscous rubber layer adhered integrally to an inner peripheral surface of the tire at the backside of the tread portion. When a foreign object falls out of a puncture and forms an opening, the same centrifugal forces caused by the rotation of the tire that dislodged the object forces the viscous sealant layer to flow into the puncture opening. The sealant layer fills and preferably closes the puncture opening to result in the tire being air-tight for continued use.

A tire having a sealed puncture can continue to be used without the puncture area being noticed by a driver. That is, an effective sealant layer can close a puncture opening to form an air-tight seal undetected by a driver. Often, the sealed area or leak can sometimes only be detected after dismounting the tire and performing an inspection. There is an interest, however, that a sealed puncture be detected to notify the driver of a possible defect, preferably without having to dismount a tire from a rim. It is an objective of the present disclosure to overcome one or more difficulties related to the prior art. It has been found that an electrically conductive tire sealant material can be used to detect a sealed puncture, for instance, on the outer surface of the tire and that an external apparatus can be used to indicate such a sealed puncture. The sealed puncture can be detected without dismounting the tire, which leads to a quick and cost effective method for notifying a driver of a puncture.

SUMMARY

In a first aspect, there is a pneumatic tire that includes an outer surface; an electrically conductive tire sealing material arranged in an interior portion of the tire, the sealing material underlies the outer surface of the tire, the sealing material contains electrically conductive metallic particles; wherein a puncture of the outer surface of the tire that contacts the sealing material is sealed by the sealing material flowing in the puncture to form a sealed tire area including a portion the sealing material, the sealed tire area is present at the outer surface of the tire, and a portion of the electrically conductive metallic particles of the sealing material are present in the sealed tire area at the outer surface of the tire.

In an example of aspect 1, the electrically conductive metallic particles are present up to 10 weight percent of the total weight of the sealing material in the tire.

In another example of aspect 1, the electrically conductive metallic particles are present in the range of 0.1 to 5 weight percent of the total weight of the sealing material in the tire.

In another example of aspect 1, the electrically conductive metallic particles do not include carbon black particles.

In another example of aspect 1, the electrically conductive metallic particles are selected from the group of nickel, copper, zinc, tin, iron, aluminum, silver, brass, silver coated copper, silver coated nickel, silver coated aluminum, silver coated tin, silver coated gold; nickel coated copper, nickel coated silver; metal coated: glass, ceramics, plastics, elastomers, and mica, and combinations thereof.

In another example of aspect 1, the electrically conductive metallic particles are nanoparticles.

In another example of aspect 1, the electrically conductive metallic particles have an average particle diameter in the range of 5 nanometers to 100 nanometers.

In another example of aspect 1, the sealed tire area is substantially air tight to prevent leakage of air inside the pneumatic tire through or around the sealed tire area.

In another example of aspect 1, the sealed tire area at the outer surface of the tire has a greater average concentration of electrically conductive metallic particles than the average concentration of electrically conductive particles or electrically conductive metallic particles over the remaining outer surface of the tire.

In another example of aspect 1, the electrically conductive tire sealing material is free of silica.

In another example of aspect 1, the outer surface of the tire has a tread portion and a sidewall portion, the tread portion and the sidewall portion each has an average electrical conductivity lower than the electrical conductivity of the electrically conductive tire sealing material.

In another example of aspect 1, the electrically conductive sealing material is a layer positioned under a tread area in a crown portion of the tire.

The first aspect may be provided alone or in combination with any one or more of the examples of the first aspect discussed above.

In a second aspect, there is a pneumatic tire that includes a tire that has an outer surface, the outer surface includes a rubber tread and a rubber sidewall, the rubber tread forms a ground-contacting portion of the outer surface; an electrically conductive tire sealing layer arranged in an interior portion of the tire, the sealing layer underlies the outer surface of the tire and the sealing layer includes electrically conductive metallic particles; wherein the electrically conductive tire sealing layer has a greater electrical conductivity than the average electrical conductivity of the rubber tread and the rubber sidewall forming the outer surface of the tire.

In an example of aspect 2, the electrically conductive metallic particles are selected from the group of nickel, copper, zinc, tin, iron, aluminum, silver, brass, silver coated copper, silver coated nickel, silver coated aluminum, silver coated tin, silver coated gold; nickel coated copper, nickel coated silver; metal coated: glass, ceramics, plastics, elastomers, and mica, and combinations thereof.

In another example of aspect 2, the electrically conductive metallic particles are present in the range of 0.1 to 5 weight percent of the total weight of the sealing layer in the tire.

In another example of aspect 2, the electrically conductive sealing layer is positioned under the rubber tread of the tire.

The second aspect may be provided alone or in combination with any one or more of the examples of the second aspect discussed above, or with any one or more of the examples of the first aspect.

In a third aspect, there is a method of detecting the presence of a sealed puncture in a pneumatic tire, the method includes positioning the tire to contact a sensor or probe of an apparatus for detecting electrical conductivity, the tire includes an outer surface and an electrically conductive tire sealing material containing electrically conductive particles, a portion of the sealing material is arranged in an interior portion of the tire that underlies the outer surface of the tire and a portion of the sealing material forms a sealed tire area at the outer surface of the tire; operating the apparatus to measure the electrical conductivity in the sealed tire area at the outer surface of the tire; and comparing the measured electrical conductivity in the sealed tire area to a baseline electrical conductivity value to determine the presence of a sealed puncture in the tire, wherein when the measured electrical conductivity in the sealed tire area is greater than the baseline electrical conductivity value the tire contains a sealed puncture.

In an example of aspect 3, the electrically conductive particles of the electrically conductive tire sealing material are metallic particles, the electrically conductive metallic particles are present up to 10 weight percent of the total weight of the sealing material in the tire.

In another example of aspect 3, the electrically conductive metallic particles of the electrically conductive tire sealing material are selected from the group of nickel, copper, zinc, tin, iron, aluminum, silver, brass, silver coated copper, silver coated nickel, silver coated aluminum, silver coated tin, silver coated gold; nickel coated copper, nickel coated silver; metal coated: glass, ceramics, plastics, elastomers, and mica, and combinations thereof.

In another example of aspect 3, the outer surface of the tire includes a rubber tread and a rubber sidewall, the rubber tread forms a ground-contacting portion of the outer surface, and the sealed tire area at the outer surface of the tire has a greater electrical conductivity than the average electrical conductivity of either the rubber tread or the rubber sidewall forming the outer surface of the tire.

In another example of aspect 3, the electrically conductive tire sealing material in the tire has a greater electrical conductivity than the average electrical conductivity of the rubber tread and the rubber sidewall of the outer surface of the tire.

In another example of aspect 3, the electrically conductive sealing material is a layer positioned under the rubber tread of the tire.

In another example of aspect 3, the sealed tire area at the outer surface of the tire is in a tread portion of the tire.

In another example of aspect 3, the sealed tire area is formed by the sealing material flowing in an open puncture, the open puncture extends from the outer surface of the tire to the sealing material that underlies the outer surface of the tire, the sealing material flows and fills the open puncture to create the sealed puncture and the sealed tire area at the outer surface of the tire.

The third aspect may be provided alone or in combination with any one or more of the examples of the third aspect discussed above, or with any one or more of the examples of the first or second aspects.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features disclosed in this specification and in the drawings can be used in any and all combinations. By way of non-limiting example the various features may be combined with one another as set forth in the specification as aspects.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more than or less than 25. In an example, such a range defines independently at least 5, and separately and independently, not more than 25.

The term "phr" means parts per hundred parts of rubber by weight, and is a measure common in the art wherein components of a composition (e.g., sealant material) are measured relative to the total of all of the elastomer (rubber) components. The total phr or parts for all rubber components, whether one, two, three, or more different rubber components are present in a rubber composition are defined as 100 phr. Other non-rubber components are generally proportional to the 100 parts of rubber and the relative amounts may be expressed in phr.

The present disclosure relates to an electrically conductive tire sealing material or sealant material, used interchangeably herein, for use in tires. The sealing material has a relatively high viscosity and is desirably not significantly influenced by heat, and therefore the material can be generally free from flowing and accumulation during running, even when a cover layer or a flow preventing wall is not used. Moreover, the viscous sealant material adheres tightly to foreign objects that penetrate through a tire, and even when a puncture opening formed through a tire by the penetration of a foreign substance is enlarged during the running of the tire and the foreign object dislodges through the enlarged opening, the foreign object can pull the viscous sealant material, which is tightly adhered to the foreign object, into the opening and fill the hole to keep the tire completely air-tight thereby forming a sealed tire area.

The electrically conductive tire sealing material can be present in the tire and preferably underlies the outermost surface of the tire, for example, the ground-contacting tread surface, the tread shoulder area or exposed outer sidewall surface. Underlying the outer surface of the tire can include the sealant material being positioned between one or more component layers of the tire or the sealant may be directly exposed to the air within the tire body. For example, the sealing material can be positioned in the tire between an inner liner layer and the carcass. The inner liner layer can be the innermost layer of the tire opposite its outer surface (i.e. the air barrier layer). In another example, the sealing material can be positioned on the outermost or innermost surface of an inner liner layer. In the case of it being positioned on the innermost surface, the sealing material can be directly exposed to the air within the tire and can function as the air barrier layer or a portion thereof, whereas when it is positioned on the outermost surface of an inner liner layer, it may be between two adjacent inner liner layers or the inner liner layer and the next adjacent layer, e.g., carcass, sidewall, belt assembly, ply, or base rubber layer underlying the tread and optionally a portion of the shoulders.

As described herein, the sealant material is a component in a self-sealing pneumatic tire. As arranged in the tire, it is contemplated that the tire has conventional components or portions, for example, a tread cap, a tread portion, rubber base layer, sidewalls, a support carcass, beads or bead portions, a belt or belt assembly, one or more plies, an inner liner that may or may not form an air barrier layer and the like.

Generally, the tire components are related to one another in the following arrangement. The sidewalls taper radially inward from the shoulder region of the tread portion to the beads or bead portions, wherein a carcass underlies the tread portion and sidewalls to provide a support structure. An inner liner layer underlies the carcass and the sealant material can be in direct contact with the inner liner layer. The outer surface of the tire, and in particular, the tread cap or portion is adapted to be ground contacting during operation.

Positioned as a component in the tire, the sealing material can be present as a layer arranged in an interior portion of the tire. The thickness of a layer composed of the sealant material can be any suitable amount to impart sufficient puncture sealing capability to the tire. The layer, for example, in an unvulcanized form, can have a thickness in the range of 0.15 to 2 cm, 0.2 to 1.5 cm, 0.3 to 1.2 cm, 0.4 to 1 cm, or 0.5, 0.6, 0.7, 0.8 or 0.9 cm. In a general passenger tire, the layer can preferably have a thickness of 0.3 to 1 cm.

The sealant material can be any suitable shape or size to provide protection from punctures. For instance, the sealant material can extend over various areas of an interior portion of the tire. In an example, the sealant material is positioned in the crown region from shoulder to shoulder. In another example, the sealant material is positioned in one or both shoulder regions and can further extend to adjacent areas of the tire, such as the sidewall area or a portion thereof. In yet another example, the sealant material is positioned from bead to bead or sidewall to sidewall in an interior portion of the tire. Preferably, at least a portion of the sealant material provides puncture protection to the tire crown region.

In addition to being able to seal punctures in a tire, the tire sealing material contains particles to provide an electrically conductive property to the tire, and particularly, to a sealed puncture area, for example at an outer surface of the tire. The tire sealing material preferably contains electrically conductive particles. The electrically conductive particles and other components of the sealing material are described below.

The tire sealing material can include those known in the art, for example, as disclosed in U.S. Pat. Nos. 3,952,787; 4,090,546; 4,228,839; 4,396,053; 4,445,562; 4,548,687; 4,607,065 and 6,194,485. The present disclosure includes tire sealing materials that contain electrically conductive particles to render the tire sealing materials conductive.

The sealing material can be prepared as known in the art, for example, as described in the above-noted patent disclosures. For example, various ingredients of the sealant material can be mixed together using convenient rubber mixing equipment, such as an internal rubber mixer. The material generally has a high enough viscosity and tack (in its unvulcanized form) to accommodate its placement in an unvulcanized tire without significantly departing from conventional tire building techniques.

As noted above, the electrically conductive tire sealing material includes electrically conductive particles, for example, electrically conductive particles that impart a conductive property to the material to promote detection of the material within or at the outer surface of the tire. Electrically conductive particles can be used interchangeably with electrically conductive powder herein. The shape of the particles can be spherical, needle shaped or needle like, plate-like or hexagonal or appear flaky or irregular or amorphous. Among them, to obtain excellent electrical conductivity, the particles preferably have a spherical shape. The electrically conductive tire sealant material can include 0.1 to 10 phr, 0.2 to 8 phr, or 0.3 to 6 phr of electrically conductive particles or less than 2 phr, 3 phr, 4 phr or 5 phr of electrically conductive particles. In another example, the electrically conductive particles can be present up to 10, 8 or 5 weight percent of the total weight of the sealant material, or in the range of 0.1 to 5, and preferably 0.2 to 2 weight percent of the total weight of the sealant material.

The electrically conductive particles are preferably well dispersed in the electrically conductive tire sealant material, for example, by mixing the electrically conductive particles with components of the material. The mixing or stirring conditions may be appropriately selected so as to form a uniform distribution of the electrically conductive particles in the material. For example, the sealant materials can be obtained by mixing the rubbers and other components with the electrically conductive particles and other fillers, such carbon black, tackifiers, resins, curing agents, rubber auxiliaries or the like in conventional mixers, such as rollers, internal mixers and mixing extruders. The viscous electrically conductive tire sealant material is capable of flowing into a puncture opening to seal a tire and in the process the material forms a sealed tire area at the outer surface of the tire, e.g., the tread. A uniform distribution of the electrically conductive particles in the sealing material can provide a portion of the electrically conductive materials being present at the outer surface of the tire in the sealed tire area. Presence of the particles at the outer surface of the tire can be detectable by various apparatuses capable of measuring electrical conductivity to indicate whether a tire has been punctured.

The data from the apparatus can be recorded to create a report for the tire, e.g., an inspection report. The data can include measurements of the electrical conductivity of the sealant material. Measured data relating to the sealant material can be compared to electrical conductivity data of other tire components, e.g., tread, sidewall or various areas exposed on the outer surface of the tire. In the case the electrical conductivity of the sealant material measured at an outer surface of the tire is greater than other measured values of non-sealant materials at the outer surface, or a set baseline electrical conductivity value or threshold known to be below the conductivity of the sealant material, that can indicate that the tire contains a sealed puncture containing the sealant material. The damaged or punctured tire determination and gathered data can be added to the inspection report to notify a person (e.g., the driver) that the tire may need to be replaced.

In one or more embodiments, the electrically conductive particles of the sealant material can be metallic. The sealant material may be free, substantially free or contain less than 2, 1, 0.5, 0.3, 0.2, 0.1 phr of other non-metal fillers or non-metal electrically conductive particles, for example, carbon black or silica materials. The electrically conductive metallic particles can include nickel, copper (e.g., annealed), zinc, tin, iron, aluminum, silver, brass, silver coated copper, silver coated nickel, silver coated aluminum, silver coated tin, silver coated gold; nickel coated copper, nickel coated silver; silvered glass; metal coated: glass (e.g., metallized glass fibers or spheres), ceramics, plastics, elastomers, and mica, and combinations thereof. The particles can be metal alloys of two or more metals, or composites in which one or more metals are coated on another metal or carrier substrate or core. Metals that are subject to oxidation can be used at the metallic particles, or alternatively, a conductive corrosion-resistant coating can be applied to prevent oxidation.

The particles employed in the sealant material are generally conductive by virtue of having at least a surface constituted by a metal (e.g., a noble metal), for example, silver, copper or nickel. Preferably, the cores of the particles, for example the portions beneath the outer surface of the particles, also contain a metal, which can be the same metal as a surface coating, to promote a high electrical conductivity. In the event the core is not a noble metal, it can be another conductive metallic material.

Purity of the electrically conductive particles of the present disclosure is not specifically limited, but preferably 90% by weight or more, 95% by weight or more and preferably 99% by weight or more.

In one embodiment, the electrically conductive particles can be electrically conductive carbon black. For example, the electrically conductive carbon black can have a DBP absorption value of at least 250 ml/100 g and a BET surface area oft least 500 $m^2/g$.

The electrically conductive particles can have an average particle size in the range of 0.1 to 10, 0.2 to 5 or 0.3 to 2 microns. The average particle size of the electrically conductive particles can be less than 5, 3, 2, 1 or 0.5 micron. In one embodiment, the electrically conductive particles can be nanoparticles, for example, the average particle size of the electrically conductive nanoparticles can be in the range of 5 to 100 nanometers (nm), or less than 80, 60, 40, 20 or 10 nm.

The electrically conductive tire sealing material can include one or more elastomers. Exemplary elastomers include, without limitation, natural rubber, styrenebutadiene rubber, polyisoprene, polyisobutylene, polybutadiene, isoprene-butadiene copolymer, neoprene, nitrile rubber, butyl rubber, polysulfide elastomer, acrylic elastomer, acrylonitrile elastomers, silicone rubber, polysiloxanes, polyester rubber, diisocyanate-linked condensation elastomer, ethylene propylene diene rubbers, chlorosulphonated polyethylene, fluorinated hydrocarbons, and combinations thereof. The terms elastomer and rubber will be used interchangeably in this specification.

In one embodiment, the electrically conductive tire sealing material can include at least one high molecular weight elastomer. The high molecular weight elastomer of the present disclosure can be any high molecular weight elastomer capable of being cross-linked. For example, the high molecular weight elastomer can include ethylene-propylene-diene terpolymers, polybutadiene, partially hydrogenated polybutadiene, butyl rubber, halo butyl rubber for example chloro- or bromo-, acrylonitrile-butadiene copolymer, styrene butadiene copolymer, natural rubber, or cis polyisoprene and combinations thereof. Mixtures of two or more of the above elastomers can also be used, as can various other conventional high molecular weight rubbers. The number average molecular weight of the high molecular weight elastomer can be at least 50,000, and preferably at least 100,000.

Ethylene propylene diene elastomers are preferred. Ethylene propylene diene elastomers are desirable for applications that involve heat, weathering and chemical exposure as well as long term aging. The elastomers can advantageously resist becoming brittle with age and can flex and accommodate changes in temperature. In one example, elastomers of this type can be terpolymers of ethylene and propylene, and a non-conjugated diene. Such elastomers can be highly extendable, allowing high levels of fillers and plasticizers to be added while maintaining desirable physical properties.

In another embodiment, the electrically conductive tire sealing material can include a polymer of relatively low molecular weight, for example, those having a number average molecular weight of about 500 to about 5,000 and which often are liquids at room temperature (that is 20° C. to 25° C.).

Various structural types of low molecular weight polymers, preferably in liquid form, can include ethylene-propylene copolymer, ethylene-propylene-diene terpolymer, polybutadiene, hydrogenated polybutadiene, butyl rubber, polypropylene (e.g., atactic), acrylonitrile-butadiene copolymer, styrene-butadiene copolymer, synthetic polyterpenes, thermoplastic olefins, pentaerythritol esters of hydrogenated rosins, triethylene glycol esters of hydrogenated rosins, vinyl toluene copolymers, alkyl aromatics, depolymerized natural rubber, polybutenes and combinations thereof. Because of their cost, availability and properties the polybutenes are desirable.

Example polybutenes can have a number average molecular weight exceeding 1,000, which can reduce migration into adjacent tire components. Polybutenes are available under the trademark Indopol, e.g. Indopol H-300 and Indopol H-1900. The Indopol grades are reported to have a polymer backbone structure resembling isobutylene and that the Indopol H-300 and Indopol H-1900 have viscosities ranging from 627-675, to 4069-4382 centistokes, respectively at 210° F. The number average molecular weights (Mn) of the same materials is respectively from 1,290 to 2,300, as determined by vapor pressure osmometry.

The electrically conductive sealant material can include a combination of low molecular weight polymer and high molecular weight elastomer. For example, in general, from 55 to 90 phr of the electrically conductive sealant material can be low molecular weight polymers with from 65 or 70 phr to 90 phr being preferred. The amount of the high molecular weight elastomer in the sealant accordingly can be from 10 to 45 phr with from 10 phr to 15, 20, 25 or 30 phr being preferred.

Additionally, other ingredients which can be utilized to prepare the electrically conductive tire sealant material include one or more reinforcing agents. A suitable agent includes finely divided carbon, such as carbon black as known in the art. Carbon black fillers can include conventional carbon blacks, for example the HAF, ISAF, SAF, FEF, APF type are suitable. Other examples of carbon black include of ASTM 300, 600 or 700 grade (e.g., N326, N330, N550). Other suitable reinforcing agents include zinc oxide, aluminum hydrate, lithopone, whiting, clays, hydrated silicas, calcium silicates, silicoaluminates, magnesium oxide, and magnesium carbonate. The amount of such reinforcing agents is from 0.1 to about 20 phr, and desirably from 1 to 20 or 1 to 10, or 5 phr.

The electrically conductive sealant material can include a resin, which can include at least one adhesive resin. It is contemplated that any resin known by those of skill in the art to be compatible with the elastomers can be contained in the electrically conductive sealant material and may be used with one or more embodiments of the present disclosure. As may be appreciated by those of skill in the art, a variety of different adhesive resins or tackifying additives may be used to practice the present disclosure. In one example, suitable resins can show a differential scanning calorimetry (DSC) glass transition temperature Tg between 30° and 60° C. and a Ring and Ball softening point between 80° and 110° C.

Multiple adhesive resins can be included in the resin, such as a mixture of phenolic resins. Adhesive resins can include resorcinol, resorcinolic derivatives, monohydric phenols and derivatives thereof, dihydric phenols and derivatives thereof, polyhydric phenols and derivatives thereof, unmodified phenol novolak resins, modified phenol novolak resin, novolak resins, and mixtures thereof. Resins can further include petroleum hydrocarbon resin tackifiers such as aliphatic petroleum resin, aromatic petroleum resin (e.g., a C5-C9 aromatic modified hydrocarbon resin), alicyclic petroleum resin and the like, or natural tackifiers. The resin or combination of resins can be present in the electrically conductive sealant material in a range of 0.5 and 10 phr, 1 and 8 phr or less than 6, 5, 4 or 3 phr.

The degree of crosslinking achieved with this or other curing systems is such as to prevent general flow of the sealant material at the high temperature experienced in the running tire and to provide the sealant with sufficient resiliency for proper sealant performance in the presence of an opening. Crosslinking ingredients are included in the sealant material when the one or more crosslinkable elastomer materials is of a type that crosslinks on exposure to vulcanization temperatures. Examples of such vulcanization agents are the standard accelerators utilized in the rubber industry; such as Santocure NS (N-Tert-butyl-2-benzothiazolesulfenamide), mercaptobenzothiazole, tetramethylthiunam disulfide; peroxides, such as dicumyl peroxide; and sulfur. It is preferable to use a crosslinking agent from the quinones class, for example a quinine dioxime, such as paraquinone dioxime. The incorporation of stearic acid and zinc oxide to assist in the crosslinkage reaction, as is known, is also contemplated. When present, the cross-linker or accelerator should be from 0.02 to 2.5 phr, the sulfur from 0.1 to 5 phr, the zinc oxide from 0.2 to 10 phr, the stearic acid from 0.1 to 5 phr and the peroxide from 1.0 to 10 phr.

The compositions of the present disclosure may further include, if desired, various appropriate additional compounding ingredients, e.g., pigments, extenders, surfactants, stabilizers and anti-oxidants.

The sealing material can also be assembled with other tire components as conventionally known in the art and be further vulcanized together with the other components to form a pneumatic tire. For instance, subsequent to the unvulcanized pneumatic tire including the sealant material is assembled, the tire and its components are vulcanized using a normal tire cure cycle, which can include a range of temperatures. In an example, a tire (e.g., a passenger tire) can be cured at a temperature in the range of 130° C. to 170° C. The tire can be cured for a period of time as conventional in the art, for example, in a range of 10 to 45 minutes or more. The length of the cure period can be dependent on the tire size and degree of desired depolymerization of the rubber contained therein. The cure period can also be affected by the thickness of the component layers themselves (e.g., the sealant material).

During use, the sealing material can fill damaged area, an opening or puncture in the tire such that a portion of the sealing material flows towards the outer surface of the tire thereby exposing the components of the sealing material at the outer surface of the tire, for example, in a sealed tire area that forms a portion of the outer surface. That is, when the sealant material contains electrically conductive particles, and the sealant material flows through a puncture opening in the tire, the sealant carries the electrically conductive particles with the flow and results in electrically conductive particles being present at and on the outer surface of the tire in a sealed tire area. Prior to the sealant material flowing to the outer surface of the tire, the outer surface would have a base or baseline electrical conductivity and a baseline low or non-existent concentration of electrically conductive metallic particles. Thus, when the electrically conductive particles of the sealant material are in an interior portion of the tire and not at the outer surface, the outer surface of the tire should not contain uncharacteristic electrical conductive peaks or readings above the baseline electrical conductivity or concentration of electrically conductive particles for tire components forming the outer surface. The electrically conductive particles of the sealant material at the outer surface of the tire can be detected by an apparatus to indicate that the tire was punctured or damaged and that the sealant material has filled the puncture or other damaged area by flowing to the surface of the tire. The detected electric conductivity of the sealant material or electrically conductive particles can correspond to a reading or measurement and the readings can be compared to baseline values for indicating the present of sealant material near or at the outer surface of the tire. The baseline electrical conductivity can be pre-determined for conventional tire components that generally form the outer surface of a tire, for example, the rubber tread or rubber sidewall components.

Electrically conductive particles of at the outer surface of the tire can be detected by any suitable apparatus, for example, an apparatus that can detect the presence of electrically conductive particles or the electrical conductivity of a material (e.g. the sealant material). As noted above, the detection or measurement of electrical conductivity by the apparatus can be compared to a baseline value other tire components or for the outer surface of the tire, which can be pre-programmed into the apparatus. Measurements can be stored in the apparatus, inclusive of the determination of whether the tire has a sealed puncture containing sealant material, which can be linked to a computer system to generate an inspection report of the tire. Alternatively, the apparatus can measure the electrical conductivity of non-sealant material components (e.g., tread, sidewalls, bead portions, shoulder areas, combinations thereof) to establish baseline conductivities. Conductivities measured above the baseline values can indicate that a portion of the electrically conductive sealant material is present at the outer surface of the tire, for example, in a sealed tire area in the tread area.

Examples of an apparatus for measuring electrical conductivity can include a meter, gauge, sensor or probe, recorder or other instrumentation. Further examples of apparatuses that can be used to detect and measure the electrical conductivity of tire components forming the outer surface include hand-held devices, electrodes, probes (surface probes), voltage systems (dc voltage) with meters (ammeter), electrical resistance meter and probe system (2, 3, 4, 5, 6 or more), and the like.

In one embodiment, a conventional electrical-resistance measuring device can be connected (e.g., electrical cords) to two or more probes that can be brought into contact with parts of the tire (e.g., bead portion and tread). Multiple measurements can be taken to ensure accuracy, for instance, the tire can be rotated slightly between measurements until a complete electrical conductivity profile of the tire is obtained. To decrease measurement times, multiple probes can be attached to various portions of the tire to gather many electrical conductivity measurements simultaneously.

Measuring the electrical conductivity from the bead portion to the tread along multiple locations around circumference of the tire can provide a baseline electrical conductivity from the rim-contacting bead to the ground-contacting tread of the tire. In the event of a puncture, for instance in the shoulder area or sidewall of the tire, the electrically conductive sealant material will flow into an open puncture area and form a sealed tire area in a portion of the sidewall or shoulder. The presence of the electrically conductive sealant material in the conductive path being measured between the rim-contacting bead to the ground-contacting tread will increase the electrical conductivity of the path due to the presence of the electrically conductive particles. That is, the electrically conductive sealant material preferably has a higher electrical conductivity value than the rubber components in the tire that form the outer surface of the tire. As described above, the conductivity path profile and baseline value can be compared to measurements taken in locations that contain a portion of the electrically conductive sealant material in the path to determine the presence of damage or a sealed puncture area.

In another embodiment, the apparatus capable of detecting electrical conductivity or the presence of electrically conductive particles has a contact area. The contact area is the area on the apparatus that is in direct contact with a material and registers a change or value of an electrical field or conductivity. Thus, the apparatus can be moved around the tire (e.g., the outer surface) such that the contact area of the apparatus touches a portion or the entire outer surface of the tire for measuring the electrical conductivity of portions of the tire. Alternatively, the tire can be moved within the contact area or areas of a stationary or fixed apparatus for indicating whether the tire has a sealed puncture. For example, one or more apparatuses can be secured in place, such as on a detection plate or station, and a tire can be rolled into an inspection area that positions the tire against the contact areas of the one or more apparatuses so the tire can be inspected for punctures by registering a change in electrical conductivity or presence of electrically conductive metallic particles.

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:

1. A pneumatic tire comprising: the tire having an outer tread surface; an electrically conductive tire sealing material arranged under the outer tread surface in a crown portion of the tire, the sealing material comprising electrically conductive metallic particles dispersed in the sealing material and present in the range of 0.1 to 8 weight percent of the total weight of the sealing material in the tire; wherein a puncture of the outer tread surface of the tire that contacts the sealing material is sealed by the sealing material flowing in the puncture to form a sealed tire area comprising a portion the sealing material, the sealed tire area being present at the outer tread surface of the tire, and a portion of the electrically conductive metallic particles of the sealing material being present in the sealed tire area at the outer tread surface of the tire, wherein the outer tread surface has an average electrical conductivity lower than the electrical conductivity of the electrically conductive tire sealing material.

2. The pneumatic tire of claim 1, the sealing material further comprising an elastomer.

3. The pneumatic tire of claim 1, the electrically conductive metallic particles not being carbon black particles, wherein the electrically conductive metallic particles are selected from the group consisting of nickel, copper, zinc, tin, iron, aluminum, silver, brass, silver coated copper, silver coated nickel, silver coated aluminum, silver coated tin, silver coated gold, nickel coated copper, nickel coated silver, metal coated glass, ceramics, plastics, elastomers, and mica, and combinations thereof.

4. The pneumatic tire of claim 1, the electrically conductive metallic particles being nanoparticles, the nanoparticles having an average particle diameter in the range of 5 nanometers to 100 nanometers.

5. The pneumatic tire of claim 1, the sealed tire area being substantially air tight to prevent leakage of air inside the pneumatic tire through or around the sealed tire area.

6. The pneumatic tire of claim 1, the sealed tire area at the outer tread surface of the tire having a greater average concentration of electrically conductive metallic particles than the average concentration of electrically conductive particles over the remaining outer surface of the tire.

7. The pneumatic tire of claim 1, the electrically conductive tire sealing material being free of silica.

8. The pneumatic tire of claim 1, the electrically conductive metallic particles comprising a metal surface.

9. The pneumatic tire of claim 8, the metal surface comprising a metal selected from the group consisting of nickel, copper, zinc, tin, iron, aluminum, silver, brass, silver coated copper, silver coated nickel, silver coated aluminum, silver coated tin, silver coated gold, nickel coated copper, nickel coated silver, metal coated glass, and combinations thereof.

10. The pneumatic tire of claim 9, the electrically conductive tire sealing material further comprising a reinforcing agent, the reinforcing agent comprising carbon black, zinc oxide, aluminum hydrate, lithopone, whiting, clays, hydrated silicas, calcium silicates, silicoaluminates, magnesium oxide, magnesium carbonate, and combinations thereof.

11. The pneumatic tire of claim 1, the electrically conductive tire sealing material comprising an elastomer and less than 2 phr of non-metal electrically conductive particles.

12. The pneumatic tire of claim 11, the non-metal electrically conductive particles comprising carbon black or silica.

13. The pneumatic tire of claim 1, the electrically conductive metallic particles having an average particle diameter of 5 micron or less and the sealing material further comprising an elastomer and 1 to 20 phr of carbon black.

14. A method of detecting the presence of a sealed puncture in a pneumatic tire, the method comprising: positioning the tire to contact a sensor of an apparatus for detecting electrical conductivity, the tire comprising an outer tread surface and an electrically conductive tire sealing material comprising electrically conductive particles dispersed in the sealing material and present in the range of 0.1 to 8 weight percent of the total weight of the sealing material in the tire, a portion of the sealing material arranged under the outer tread surface in a crown portion of the tire and a portion of the sealing material forming a sealed tire area at the outer tread surface of the tire; operating the apparatus to measure the electrical conductivity in the sealed tire area at the outer tread surface of the tire; and comparing the measured electrical conductivity in the sealed tire area to a baseline electrical conductivity value to determine the presence of a sealed puncture in the tire, wherein when the measured electrical conductivity in the sealed tire area is greater than the baseline electrical conductivity value the tire contains a sealed puncture.

15. The method of claim 14, the electrically conductive particles of the electrically conductive tire sealing material being metallic particles, wherein the electrically conductive metallic particles of the electrically conductive tire sealing material are selected from the group consisting of nickel, copper, zinc, tin, iron, aluminum, silver, brass, silver coated copper, silver coated nickel, silver coated aluminum, silver coated tin, silver coated gold, nickel coated copper, nickel coated silver, metal coated glass, ceramics, plastics, elastomers, and mica, and combinations thereof.

16. The method of claim 14, the electrically conductive tire sealing material in the tire having a greater electrical conductivity than the average electrical conductivity of a rubber sidewall of the tire.

17. The method of claim 14, the sealed tire area being formed by the sealing material flowing in an open puncture, the open puncture extending from the outer tread surface of the tire to the sealing material underlying the outer tread surface of the tire, the sealing material flows and fills the open puncture to create the sealed puncture and the sealed tire area at the outer tread surface of the tire.

* * * * *